United States Patent [19]

Neville

[11] 4,060,273
[45] Nov. 29, 1977

[54] VEHICLE BODY COVERING DEVICE

[75] Inventor: George Edgar Neville, Mansfield, England

[73] Assignee: George Neville Truck Equipment Limited, England

[21] Appl. No.: 605,940

[22] Filed: Aug. 19, 1975

[30] Foreign Application Priority Data

Aug. 21, 1974 United Kingdom ............... 28732/74

[51] Int. Cl.² .............................................. B60P 7/04
[52] U.S. Cl. .................................... 296/100; 105/377; 160/207; 296/137 B
[58] Field of Search ................. 296/100, 101, 104, 98, 296/137 B, 137 C; 105/377; 160/213, 207

[56] References Cited

U.S. PATENT DOCUMENTS

| 2,346,554 | 4/1944 | Clark | 296/100 |
| 3,132,600 | 5/1964 | Allard | 105/377 X |
| 3,628,828 | 12/1971 | Page et al. | 105/377 X |
| 3,841,697 | 10/1974 | McFarland | 296/100 |
| 3,861,737 | 1/1975 | Kirkbride | 296/137 B X |

Primary Examiner—Joseph F. Peters, Jr.
Assistant Examiner—Michael J. Forman
Attorney, Agent, or Firm—Larson, Taylor and Hinds

[57] ABSTRACT

A covering device for an open topped vehicle container, the covering device being movable laterally of the container to one side to uncover the open top, the cover being preferably flexible and anchored along said side of the container so that the cover folds as the device uncovers the open top. In the preferred embodiment, the device has two pivoted parts which fold together as the device uncovers the open top.

7 Claims, 4 Drawing Figures

VEHICLE BODY COVERING DEVICE

This invention is concerned with a vehicle body covering device, for use in covering an open-top vehicle body with a flexible cover such as a tarpaulin.

It is common practice to cover open-top loads in vehicle bodies with tarpaulin, or the like, for protection and to prevent spillage. Such loads are usually covered manually and this is an awkward and time-consuming operation, made particularly difficult in windy conditions. It has been proposed to provide, on a vehicle body, a device for facilitating covering with a flexible cover by providing pivoted arms which unroll the cover from a drum, during pivotal movement of the arm, and lays the cover longitudinally of the vehicle. In such constructions, the cover does not protect the whole top of the body, there being gaps at the sides of the body, and, also, the arms project to the sides of the vehicle. The overall width possible in a vehicle is limited and is controlled by legislation, so that projections from the side of the vehicle body limit the maximum possible storage width of the body.

The present invention provides an improved device for covering an open-top vehicle body.

The present invention provides a vehicle body covering device comprising an elongate main frame having a mouth and a support frame adapted for carrying a flexible cover, the support frame being pivotally mounted for movement laterally of the main frame between first and second positions wherein, in use, the mouth is covered and uncovered respectively.

Preferably, in the first position, there is no lateral projection of the support frame beyond the main frame.

Reference is now made to the accompanying drawings, wherein.

Figure 1:
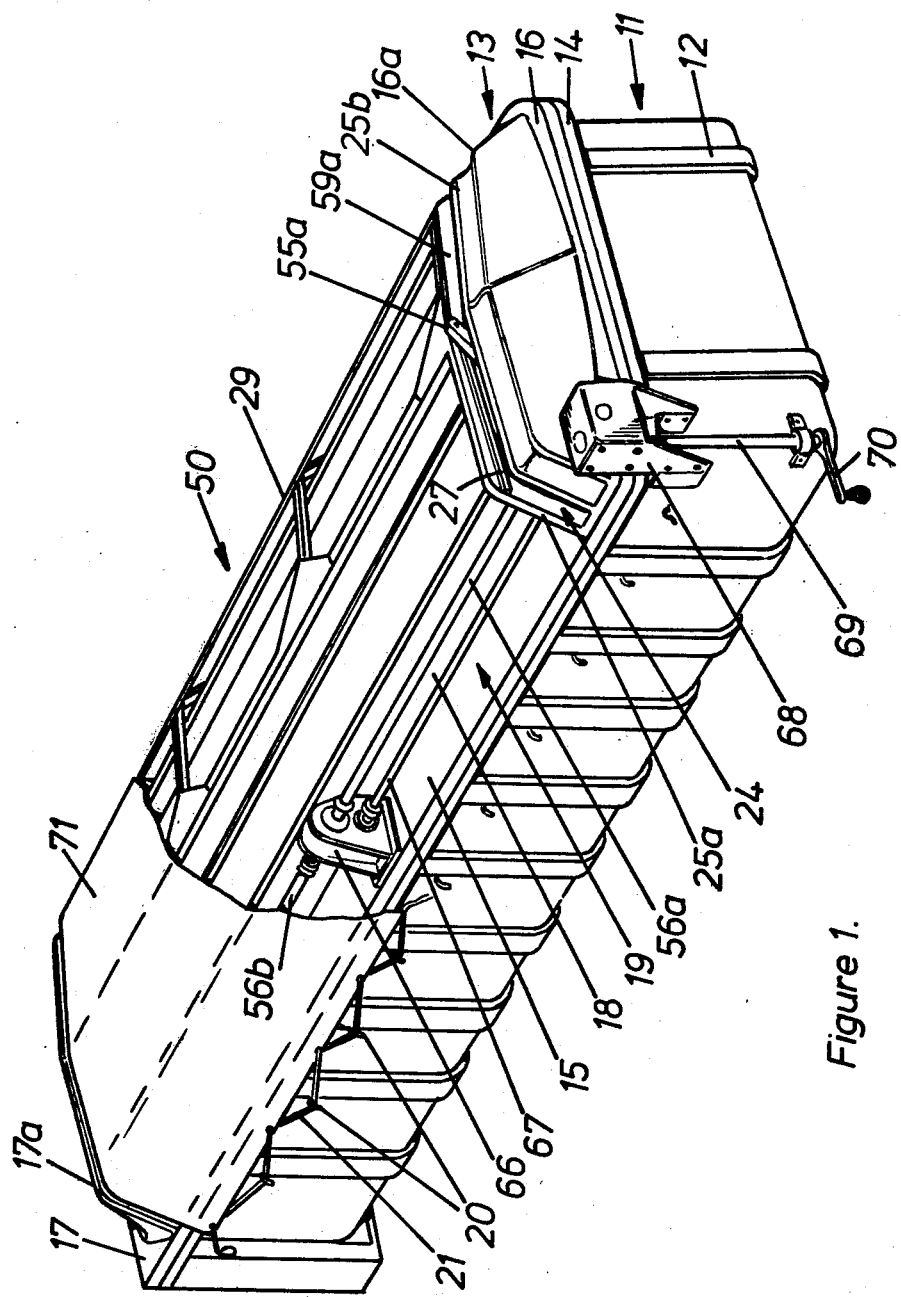
FIG. 1 is a perspective view of a vehicle body provided with a covering device according to the invention and with a cover sheet.
Figure 3:
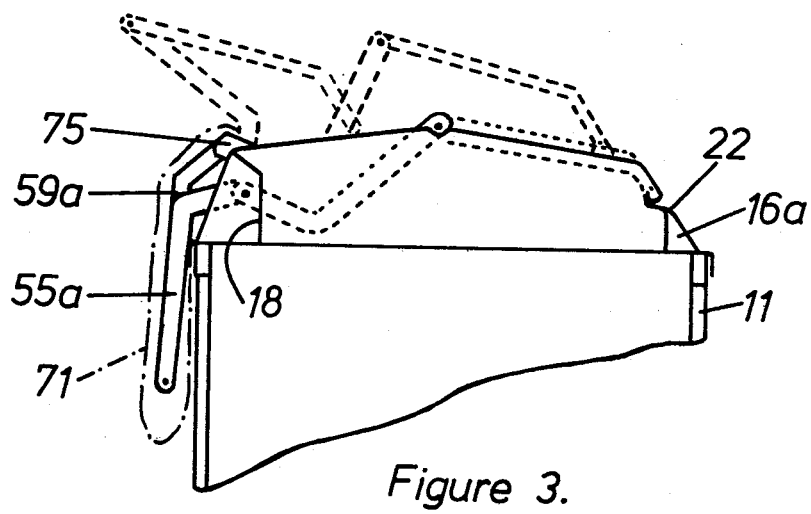
FIG. 3 is a diagrammatic sectional elevation of the device shown in FIG. 2 shown in the fully open position, the vehicle body and the cover sheet being shown diagrammatically.

Referring to FIG. 1, the vehicle body 11 shown is an open-top, generally rectangular container having reinforcement ribs 12. In use, the body is mounted on a vehicle. A framework 13 of the covering device 50 is mounted on a lip 14 of the container and provides a longitudinal platform 15 at one side of the body and transverse platforms 16, 17 at opposite ends of the body. Each transverse platform 16, 17 mounts a plastics upright end unit 16a, 17a respectively and the longitudinal platform 15 mounts an upright wall 18 between the end units 16a, 17a, defining a longitudinal recess 19. The covering device supports a cover sheet 71. The sheet is fastened along one side of the body 11 by means of hooks 20 on the body and by an elastic rope 21. In the closed position shown in FIG. 1, at the opposite side of the body, the cover sheet 70 is mounted on the covering device 50. A longitudinal wall 22 (FIG. 3) at the other side of the body delimits the maximum loading height. A channel 24, extending widthwise of the body, is provided in each end unit 16a, 17a between inner and outer walls 25a, 25b of the unit. This channel 24 houses a lever mechanism of the covering device as hereafter described. Each inner wall 25a carries in the channel, a metal guide rail. Each inner wall 25a and guide rail 27 has sloping surfaces defining an apex.

Figure 2:
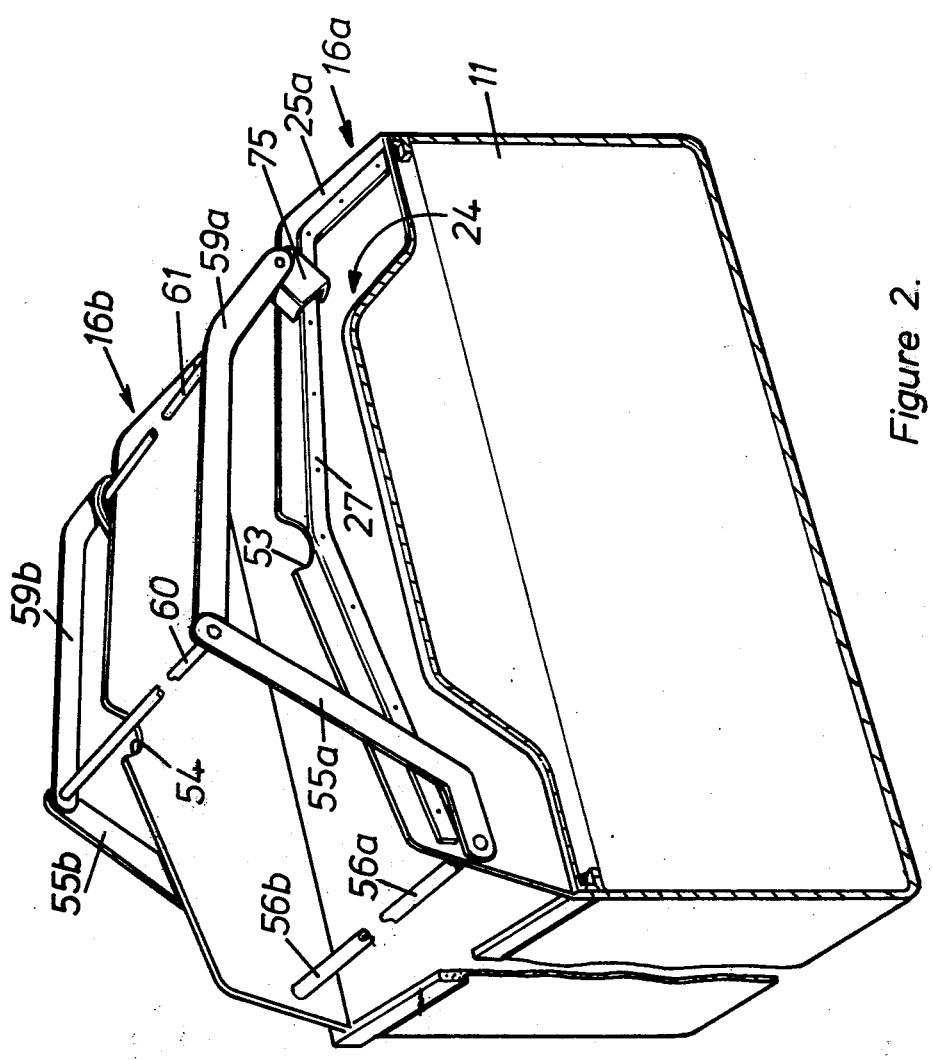
FIG. 2 is a perspective view of the device of FIG. 1 with the vehicle body shown diagrammatically for clarity, the device being almost in the fully closed, or covering position and the cover sheet being removed.

Referring now to FIG. 2, it can be seen that each inner wall 25a includes a depression 53, 54 respectively, at its apex.

The support frame 29 is movable by a pair of levers 55a, 55b mounted on co-axial pivot members 56a, 56b, at one side of the body 51. The pivot members are rotatable in unison, as described later, which is to swing the levers.

The support frame 29 includes a pair of arms 59a, 59b, pivotally connected to the levers 55a, 55b by a common hinge pin 60 and the arms are also interconnected by a brace 61.

The brace 61 serves as a pivot to mount the arms 59a, 59b pivotally on respective carriers such as 75. These carriers engage with the rail 27 for movement therealong. Each carrier may have sliding engagement with the rail or may house a roller which runs on the rail.

Referring back to FIG. 1, it will be seen that the pivot members 56a, 56b are co-axial output shafts from opposite sides of a reduction gear box 66. The gear box is centrally placed longitudinally of the body to keep torque to a minimum. An input shaft 67 to the gear box 66 is driven from the output side of a bevel gear box 68 whose input shaft 69 is manually rotatable by means of a handle 70. In this example, the input shaft 69 extends vertically, to permit access to the handle from ground level, but may extend horizontally.

The flexible sheet 71 is mounted at one edge on the hooks 20, as previously described, and at the opposite edge on the brace 61 (FIG. 2) of the support frame 29.

In use, it will be evident from FIG. 2 that the hinge pin 60 is located in the depressions 53, 54 and the carriers 75 lie at the right hand bottom end of the rails 27. The cover 71 is then stretched over the support frame, as shown in FIG. 1.

Turning of the handle 70 causes raising of the levers 55a, 55b, i.e. movement to the left as shown in the figures. As the levers move to the left, the angle between the arms and the levers reduces and the carriers 75 slide along the guide rails to the left. The right hand edge of the cover is, therefore, also drawn to the left, uncovering the top of the vehicle body. The hinge pin 60 is gradually raised and lifts up the cover preventing it from sagging. Eventually, the levers and the arms lie side by side extending downwardly at the left side of the body and the cover 71 balloons downwardly at this side. This position is shown in full lines in FIG. 3 and two intermediate positions are also shown in dash lines. It will be seen that there is no sagging of the cover until the cover is at the side of the body, the support frame 29 serving to lift the cover and take it across the open top of the body in a controlled manner.

The central location of the gear box 66 longitudinally of the body reduces torque during operation.

It will be seen that in the closed, or covered position, there is no projection of the device 50 to the side of the vehicle body 11. Nor, in the uncovered position, does the device 50 impede access to the interior of the body 11.

It is envisaged that the covering device may be hydraulically operated or driven by means of a pulley arrangement.

Figure 4:
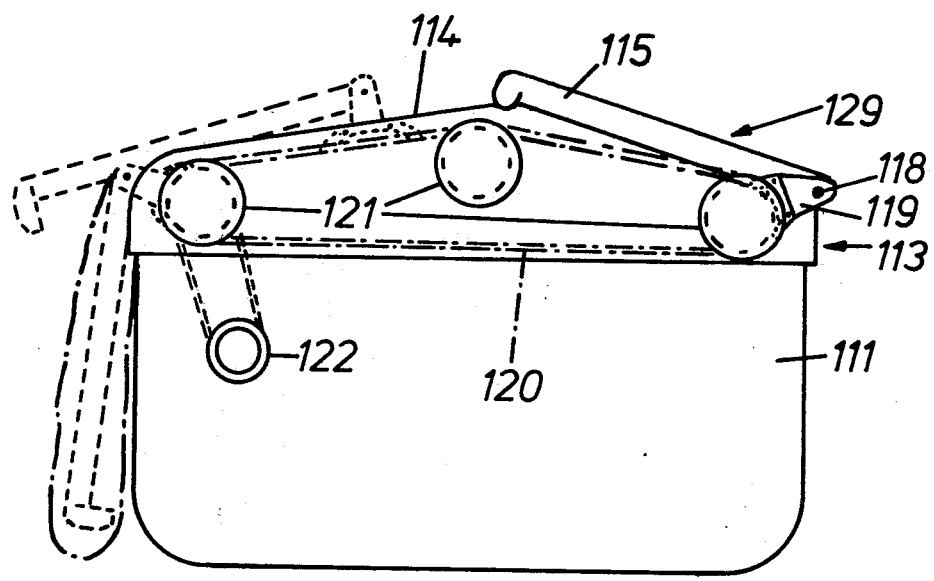
FIG. 4 is a sectional, diagrammatic view of an alternative embodiment.

Referring to FIG. 4, an alternative embodiment is shown, in which the covering device comprises a main frame 113 similar to that shown in FIG. 1 and mounted on a vehicle body 111. The device includes a support frame 119 including a pair of arms 115, which move in angle-section guides 114 on the main frame, one guide at each end of the body. In this example, a movable continuous member in the form of a chain 120 is provided at each end of the body and each arm 115 is pivoted at 118 to a corresponding one of the chains by means of a boss 119 on the chain. Movement of the chains is reciprocal to carry the support frame between the closed full-line position and the open dash-line position of FIG. 4. The chains may be manually driven, or driven by hydraulic means. In this example, the chains are carried by sprockets 121, each set of sprockets for each chain having common shafts with the set of sprockets at the opposite end of the body. One of the sprockets is driven by a motor 122.

One of the sprockets may be movable to adjust to chain tension, or a further tensioner may be provided.

The support fame 119 may be driven by hydraulic means or manually, if desired.

What we claim is:

1. A vehicle body covering device for attachment to an open-top vehicle body, said device comprising: a main frame, comprising first and second upstanding, longitudinally spaced, end walls and a longitudinally extending side member interconnecting said end walls at one side of said main frame, and defining an opening between said end walls and said side member through which the vehicle body can be loaded and unloaded; means for mounting the main frame on the vehicle body so that said interconnecting side member is disposed along one side of the vehicle body; a moveable support frame carried by said main frame and adapted to support a cover, said support frame comprising a pair of longitudinally spaced arms, means for mounting each arm adjacent a respective end wall for lateral movement in a path adjacent its respective end wall; means for moving said pair of longitudinally spaced arms of said support frame in said path between a first, covering position wherein a cover supported by said support frame extends across the full width of the vehicle body and covers said opening and a second, uncovering position wherein said longitudinally spaced arms and said cover carried thereby are disposed adjacent to said interconnecting side member so as to uncover said opening; said pair of longitudinally spaced arms of said support frame being positioned, in said covering position, with their outer ends adjacent the side of said main frame remote from said longitudinally extending side member and with their inner ends positioned, in said covering position, with their inner ends intermediate the sides of said main frame; a longitudinal connecting member interconnecting the outer ends of said pair of longitudinally spaced arms and moveable therewith; and a further longitudinal connecting member interconnecting said longitudinally spaced arms at a point intermediate the sides of said main frame and moveable therewith, said longitudinal connecting member and said further longitudinal connecting member being adapted to support a cover for said opening.

2. A device according to claim 1, wherein said means for moving said pair of longitudinally spaced arms comprises a pair of lever members each of which having an outer end pivotally connected to a respective end wall for lateral motion in a path adjacent its respective end wall and having an inner end pivotally connected to an inner end of a respective longitudinally spaced arm of said moveable support frame.

3. A device according to claim 2, wherein each lever member is at an obtuse angle to a respective arm in the covering position, the angle reducing as the arms are moved towards the uncovering position.

4. A device according to claim 3, wherein each lever is swingable by means of a gear box output shaft, the input to the gear box including a handle for manual operation.

5. A device according to claim 4, wherein the gear box is substantially centrally located longitudinally of the main frame.

6. A device according to claim 1, wherein said means for moving said pair of longitudinally spaced arms comprises a continuous member pivotally connected to at least one of the arms, and means for reciprocably driving the continuous member.

7. A device according to claim 6, wherein the continuous member is a chain carried by sprockets, one of which is driven.

* * * * *